US012784300B2

(12) United States Patent
Chepkwony

(10) Patent No.: US 12,784,300 B2
(45) Date of Patent: Nov. 3, 2026

(54) GENERATING NEW CONTENT FROM EXISTING PRODUCTIVITY APPLICATION CONTENT USING A LARGE LANGUAGE MODEL

(71) Applicant: Microsoft Technology Licensing, LLC, Redmond, WA (US)

(72) Inventor: Isaac Chepkwony, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 590 days.

(21) Appl. No.: 18/174,740

(22) Filed: Feb. 27, 2023

(65) Prior Publication Data

US 2024/0289360 A1 Aug. 29, 2024

(51) Int. Cl.
*G06T 11/60* (2026.01)
*G06F 16/332* (2025.01)
*G06F 40/40* (2020.01)

(52) U.S. Cl.
CPC .......... *G06T 11/60* (2013.01); *G06F 16/3328* (2019.01); *G06F 40/40* (2020.01)

(58) Field of Classification Search
CPC ....... G06F 16/3328; G06F 40/40; G06T 11/60
See application file for complete search history.

(56) References Cited

U.S. PATENT DOCUMENTS 11,372,873 B2 * 6/2022 Lindley ................. G06F 16/248
11,423,207 B1 * 8/2022 Li .......................... G06N 20/00
11,769,017 B1 * 9/2023 Gray ....................... G06F 40/56 704/9
11,797,780 B1 * 10/2023 Finegan .................. G06F 40/40
2013/0346843 A1 * 12/2013 Murray .................. G11B 27/34 715/275
2018/0349449 A1 * 12/2018 Lindley ................. G06F 16/483
2021/0076105 A1 * 3/2021 Parmar .......... H04N 21/234336
2022/0067077 A1 * 3/2022 Tupakula .............. G06F 16/345
2022/0147702 A1 * 5/2022 Li .......................... G06N 3/088
2022/0366153 A1 * 11/2022 Li ..................... G06F 16/24578
2023/0112921 A1 * 4/2023 Cai ........................... G06F 8/31 717/104
2023/0153460 A1 * 5/2023 Song ................... G06F 21/6245 726/26

(Continued)

OTHER PUBLICATIONS

Nutanc, "How to build a text to Google slide using GPT-3 in under an hour", Retrieved From: https://gpt3experiments.substack.com/p/how-to-build-a-text-to-google-slide, Aug. 12, 2020, 6 Pages.

(Continued)

*Primary Examiner* — Anne L Thomas-Homescu

(57) ABSTRACT

Systems and methods for generating new content from a machine-learning model. A content generator extracts string content from existing slides of a slide presentation document and generates a text query using the existing slide content as context. The query is directed to a large language model. Additionally, prompt input from a user is received and combined with the context in the query. A response from the large language model is parsed and text output is separated into prospective slides to add to the slide presentation document. Upon selection of one or more prospective slides, the prospective slides are generated and added as new slides to the slide presentation document.

20 Claims, 6 Drawing Sheets

(56) References Cited

U.S. PATENT DOCUMENTS

| | | | | |
|---|---|---|---|---|
| 2023/0252224 | A1* | 8/2023 | Tran | G06F 40/56<br>715/256 |
| 2023/0394855 | A1* | 12/2023 | Xie | G06F 40/40 |
| 2023/0409298 | A1* | 12/2023 | Ciminelli | G06F 3/04842 |
| 2024/0037822 | A1* | 2/2024 | Aberman | G06F 3/04845 |
| 2024/0111960 | A1* | 4/2024 | Earle | G06F 40/35 |
| 2024/0112394 | A1* | 4/2024 | Neal | G06T 15/10 |
| 2024/0126981 | A1* | 4/2024 | Shahinian | G06F 40/40 |
| 2024/0143928 | A1* | 5/2024 | Zorn | G06F 40/56 |
| 2024/0143932 | A1* | 5/2024 | Pandita | G06F 40/44 |
| 2024/0161520 | A1* | 5/2024 | Li | G06F 40/284 |
| 2024/0169974 | A1* | 5/2024 | Bonar | G10L 15/26 |
| 2024/0256622 | A1* | 8/2024 | Abrams | G06F 16/9538 |
| 2024/0282298 | A1* | 8/2024 | Koneru | G10L 15/183 |

OTHER PUBLICATIONS

Bemmu, Sepponen, "I asked GPT-3 to make a presentation for me", Retrieved From: https://www.bemmu.com/gpt3-presentation, Jul. 20, 2020, 5 Pages.

* cited by examiner

GENERATING NEW CONTENT FROM EXISTING PRODUCTIVITY APPLICATION CONTENT USING A LARGE LANGUAGE MODEL

BACKGROUND

Productivity applications are designed to help entities (e.g., individuals and organizations) generate content and data (e.g., electronic communications, schedules, documents, projects) more efficiently. Some productivity applications are used to create and edit documents, spreadsheets, and presentations. Generating new content for a document, spreadsheet, or presentation (generally, productivity document) can consume large amounts of time and, in some cases, extensive computing resources, due to significant manipulation of data and input/output cycles.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for generating new content for a productivity application document using a large language model. In an example implementation, a content generation system and method are described that extract string content from existing slides of a slide presentation document and generate a text query using the existing slide content as context. The query is directed to a large language model. Additionally, prompt input from a user is received and combined with the context in the query. A response from the large language model is parsed and text output is separated into prospective slides to add to the slide presentation document. Upon selection of one or more prospective slides, the prospective slides are generated and added as new slides to the slide presentation document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Examples described in this disclosure relate to systems and methods for generating new content based on existing productivity application content through the use of a language model, such as a large language model (LLM). In an example implementation, a content generator is provided that extracts string content from existing slides of a slide presentation document. The content generator preprocesses the extracted string content to generate a computationally efficient text query using the existing slide content as context. The context for generating the query may also be based on prompt input from a user. The generated query is directed to a large language model.

A response from the LLM is received and parsed. Text output from the LLM is separated into prospective slides to add to the slide presentation document. Upon selection of one or more prospective slides, the prospective slides are generated and added as new slides to the slide presentation document. Those new slides may also inherit the properties of the other slides within the presentation document.

Among other things, the technology disclosed herein generates new slides directly from machine learning model output, which reduces input/output cycles and eliminates the requirement of launching and hosting multiple different applications outside of the presentation application. Additionally, various constraints may be incorporated in the query to cause the processing of the query by the LLM to be more computationally efficient, and those constraints may be generated from context of selected slides. For instance, slide number limitations, character limitations, etc., prevent the machine learning model from generating more information than is needed. Further, the extracted context for text queries to the LLM lead to more accurate and/or usable results from the LLM in the first response from the LLM, which reduces the need to expend further computing resources for reruns and/or additional query modifications.

Figure 1:
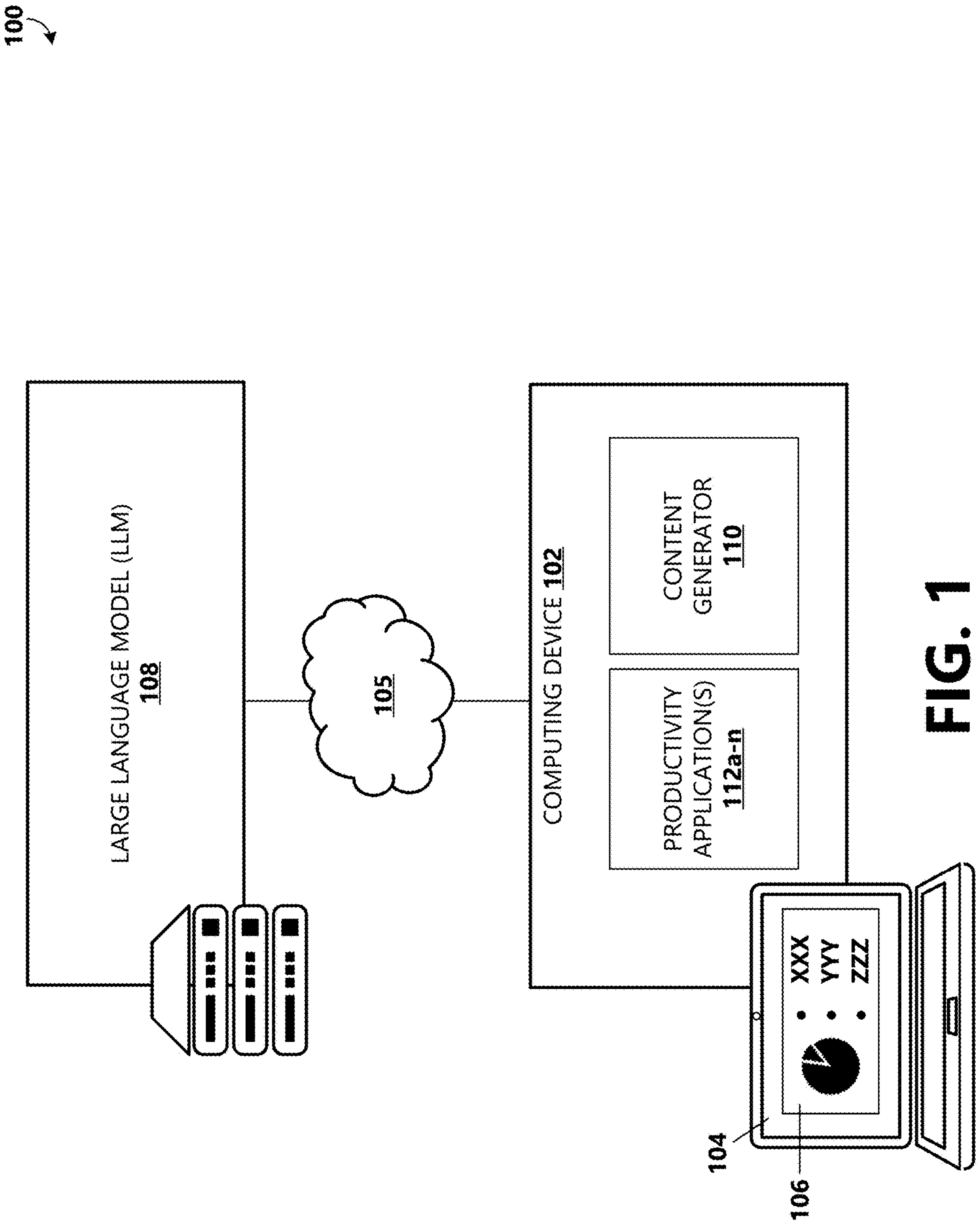
FIG. 1 is a block diagram of a system in which a new content generation system is implemented according to an example.
Figure 5:
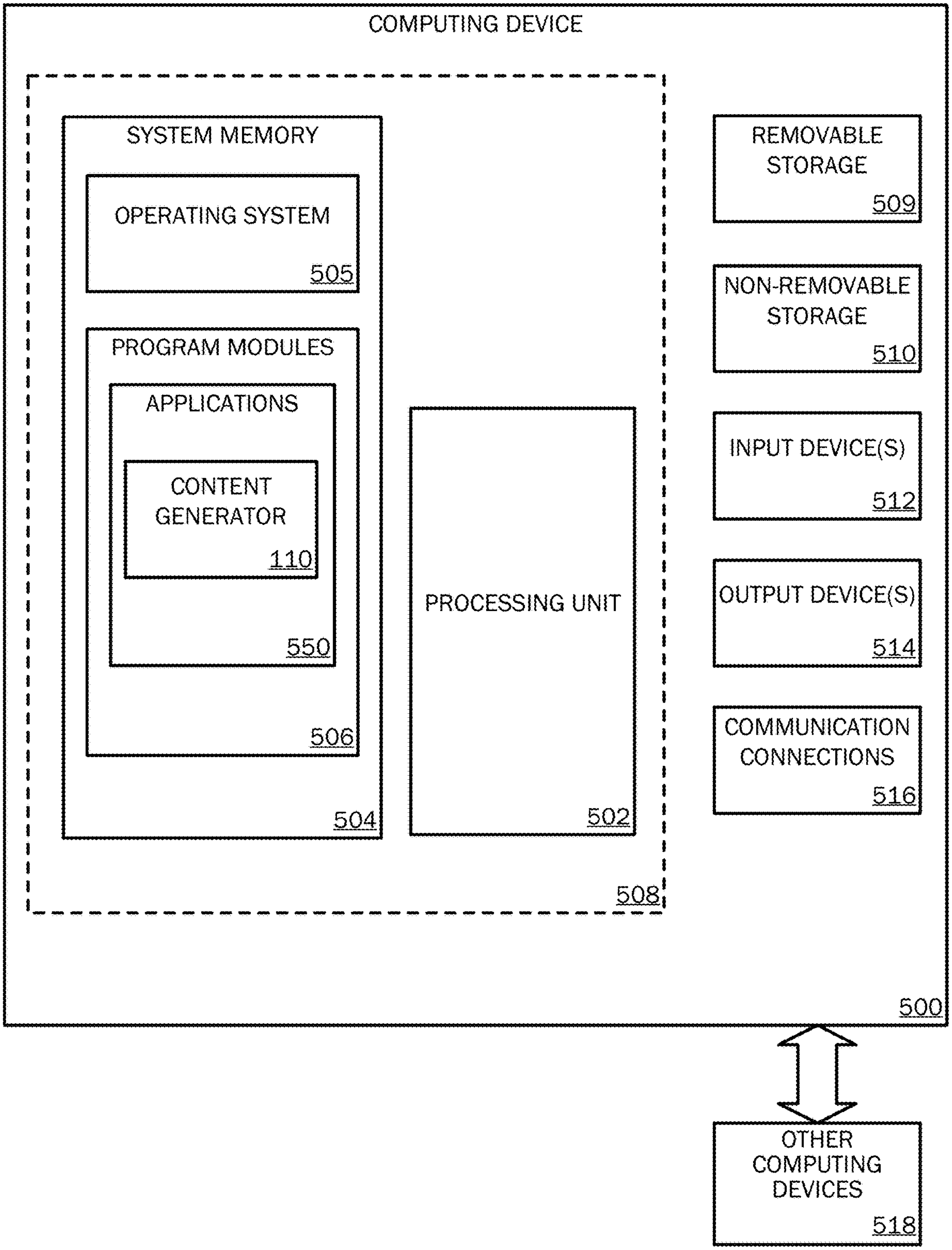
FIG. 5 is a block diagram illustrating example physical components of a computing device with which aspects of the disclosure may be practiced.

FIG. 1 is a block diagram of an example system 100 for providing new content generation in accordance with an example embodiment. The example system 100, as depicted, is a combination of interdependent components that interact to form an integrated whole. Some components of the system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 5. In another example, the components of systems disclosed herein are distributed across multiple processing devices. For instance, input may be entered on a user device or client device and information may be processed on or accessed from other devices in a network, such as one or more remote cloud devices or web server devices.

The example system 100 generates new content, from an LLM, based on existing productivity application content. According to an aspect, the system 100 includes a computing device 102 that may take a variety of forms, including, for example, desktop computers, laptops, tablets, smart phones, wearable devices, gaming devices/platforms, virtualized reality devices/platforms (e.g., virtual reality (VR), augmented reality (AR), mixed reality (MR)), etc. The computing device 102 has an operating system that provides a graphical user interface (GUI) that allows users to interact with the computing device 102 via graphical elements, such as application windows (e.g., display areas), buttons, icons, and the like. For example, the graphical elements are displayed on a display screen 104 of the computing device 102 and can be selected and manipulated via user inputs received via a variety of input device types (e.g., keyboard, mouse, stylus, touch, spoken commands, gesture).

In examples, the computing device 102 includes a plurality of productivity applications 112*a-n* (collectively, productivity applications 112) for performing different tasks, such as communicating, information generation and/or management, data manipulation, visual construction, resource coordination, calculations, etc. As an example, the productivity applications 112 can include, but are not limited to, a presentation application, a word processing application, a graphics application, a database application, a spreadsheet application, a web browser, enterprise software, an information worker application, a multimedia application, a content access application, and the like. The productivity application(s) 112 may be local applications or web-based applications accessed via a web browser. Each productivity application 112 has one or more application UIs 106 by which a user can view application data and interact with the productivity application 112. For example, an application UI 106 may be presented on the display screen 104. In some examples, the operating environment is a multi-application environment by which a user may view and interact with multiple productivity applications 112 through multiple application UIs 106.

According to examples, the system 100 further includes a content generator 110 that generates new content from existing productivity application content. In some implementations, the content generator 110 is included in one or more productivity applications 112. The content generator 110 is a separate module that is communicatively integrated into one or more productivity applications 112 via an application programming interface (API). As will be described in further detail below, the content generator 110 provides functionality for generating new content for a productivity application document by preprocessing a prompt input and existing productivity application content into a text query for an LLM 108 and postprocessing the results to generate prospective content for adding to the productivity application document.

According to example implementations, the LLM 108 is a generative machine learning model trained to understand and generate sequences of tokens, which may be in the form of natural language (e.g., human-like text). In various examples, the LLM 108 can understand complex intent, cause and effect, perform language translation, semantic search classification, complex classification, text sentiment, summarization, summarization for an audience, and/or other natural language capabilities.

The LLM 108 may be in the form a deep neural network that utilizes a transformer architecture to process the text it receives as an input or query. The neural network may include an input layer, multiple hidden layers, and an output layer. The hidden layers typically include attention mechanisms that allow the LLM 108 to focus on specific parts of the input text, and to generate context-aware outputs. The LLM 108 is generally trained using supervised learning based on large amounts of annotated text data and learns to predict the next word or the label of a given text sequence.

The size of a LLM 108 may be measured by the number of parameters it has. For instance, as one example of an LLM, the GPT-3 model from OpenAI has billions of parameters. These parameters are the weights in the neural network that define its behavior, and a large number of parameters allows the model to capture complex patterns in the training data. The training process typically involves updating these weights using gradient descent algorithms, and is computationally intensive, requiring large amounts of computational resources and a considerable amount of time. The LLM 108 in examples herein, however, is pre-trained, meaning that the LLM 108 has already been trained on the large amount of data. This pre-training allows the model to have a strong understanding of the structure and meaning of text, which makes it more effective for the specific tasks discussed herein.

In example implementations, the LLM 108 operates on a device located remotely from the computing device 102. For instance, the computing device 102 may communicate with the LLM 108 using one or a combination of networks 105 (e.g., a private area network (PAN), a local area network (LAN), a wide area network (WAN)). In some examples, the LLM 108 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

Figure 2:
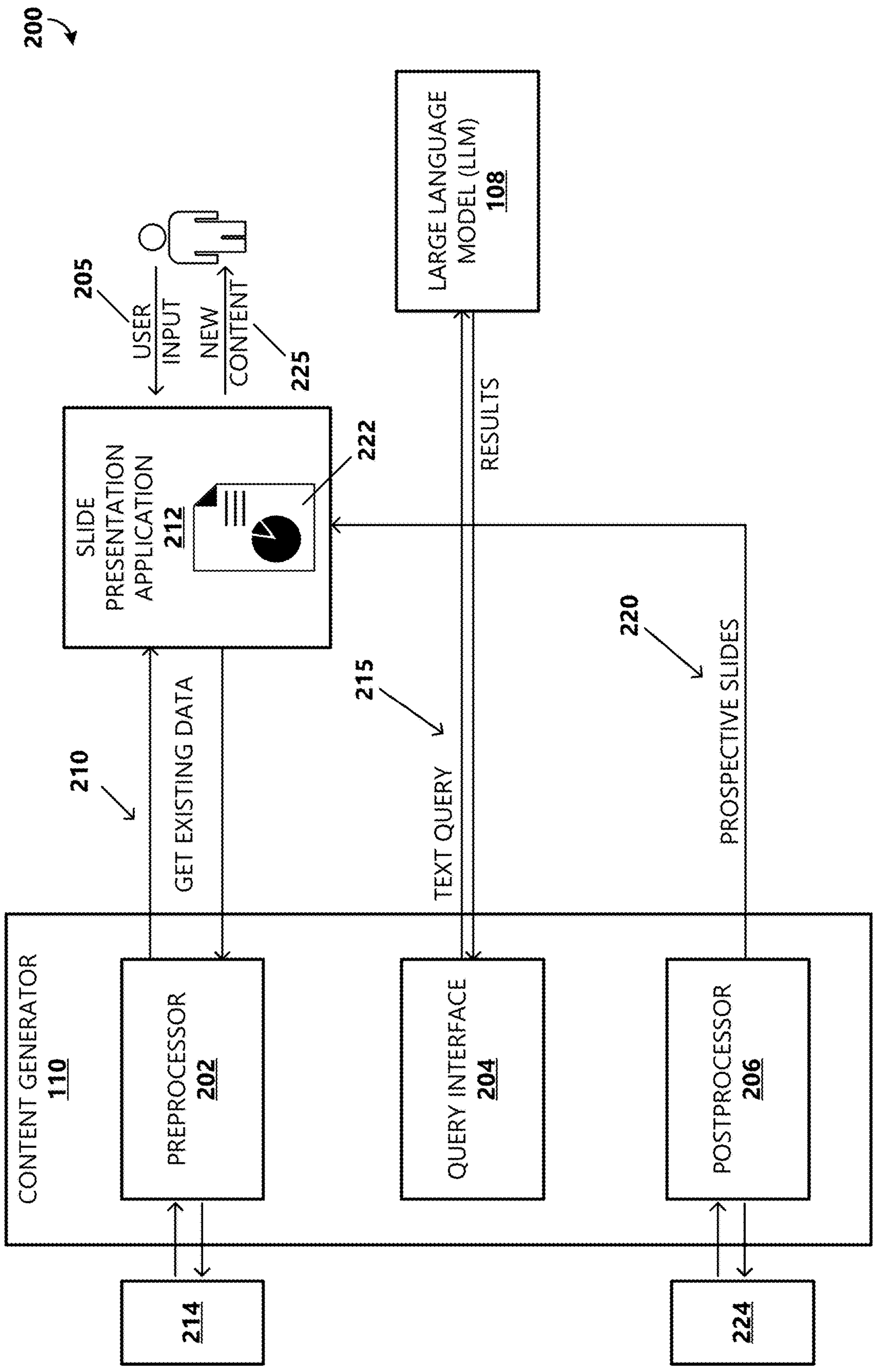
FIG. 2 is a block diagram of example components of a content generator and an example data flow.

FIG. 2 is a block diagram illustrating example components of the content generator 110 and an example data flow 200. As depicted, the content generator 110 includes a preprocessor 202, a query interface 204, and a postprocessor 206. A user may use a productivity application 112 to generate content for a document. According to an example implementation, the productivity application 112 is a slide presentation application 212 that is used to create documents embodied as slide presentations that include multiple slides. For instance, a slide presentation document 222 includes one or more slides that convey information through text, images, charts, graphs, and/or other visual or audio elements.

Data communication 205 represents a user request to generate new content in a slide presentation document 222 based on one or more existing slides in the document. For instance, the one or more existing slides include existing content (e.g., text, images, charts, graphs, and/or other visual or audio elements). In some examples, the existing content has various formatting properties, such as a word count range, text formatting, paragraph formatting, graph formatting, image formatting, and/or other properties. In some examples, the user request corresponds to a user input, such as a selection of a content generation option displayed in the application UI 106. In some examples, selection of the content generation option causes a selection of all existing slides/content in the slide presentation document 222. In other examples, a portion of the existing content is selected (e.g., a last slide, last 2 slides). In further examples, a content selection option is provided in the application UI 106, which allows the user to select specific portions of existing content in the slide presentation document 222. For instance, the content selection option allows the user to select one or more slides to use as a basis for generating new content.

Additionally, in some examples, data communication 205 further includes a prompt input. In some examples, a prompt UI field is provided in the application UI 106 via which the user can provide the prompt input. For instance, the user may type, speak, or otherwise input a phrase or individual keywords in association with a statement, question, instructions, or other request for new content. As an example, the user may type or utter a phrase such as, "More details," "Make this longer," "Summarize this," "Complete this," or "Insert a story," which is received as the prompt input.

Data communication 210 represents a communication between the slide presentation application 212 and the preprocessor 202 of the content generator 110, where the preprocessor 202 receives the prompt input and extracts existing data from the slide presentation document 222. In some examples, the preprocessor 202 extracts string content from the selected slides in the slide presentation document 222. For instance, the slide presentation application 212 includes an object model that allows objects (e.g., text boxes, images, diagrams) in the slide presentation document 222 to be evaluated for string content. In some examples, the preprocessor 202 gathers extracted string content from the selected slides into a context object, where the context object is a data structure that includes information that can be used to understand context about the existing content of the slide presentation document 222. According to examples, the term "context" is used to describe information that can influence an interpretation and execution of the request to generate new content. For instance, if the existing content includes string content about a specific topic, the LLM 108 can use that information to generate new content that is relevant to that topic.

According to examples, the preprocessor 202 further combines the context object with the received prompt input to generate a text query as input for the LLM 108. Where no prompt input is received from the user, a default prompt input may be automatically generated and prepended to the context object. For instance, the default prompt input may be "Generate multiple slides given the following context:," and the resultant text query may be in the form of "Generate multiple slides given the following context:"+context_Object. In some examples where the prompt input has been received from a user, the text query includes the context object, the prompt input, and additional string content. As an example, a text query is generated with the following string, ""Given the following context:"+context_Object+"Do the following:"+input_prompt (e.g., "More details," "Make this longer," "Summarize this," "Complete this," or "Insert a story")," where the context object includes the extracted string content from the existing slides.

In further examples, the preprocessor 202 extracts images from one or more slides in the slide presentation document 222. According to an example implementation, the preprocessor 202 includes or is in communication with one or more resources 214, such as an image processor that performs image recognition on extracted images to identify and categorize objects, people, scenes, actions, and other context within the images. For instance, the image processor uses machine learning algorithms and deep learning neural networks to analyze and classify visual data, recognize patterns and objects in the images, and understand and interpret content of the images. In some examples, the image processor returns string content representative of recognized visual data in the images. In some examples, the preprocessor 202 includes the string content representative of the image data in the context object of the text query.

In further examples, the preprocessor 202 receives one or more new-content options from the slide presentation application 212. In some examples, the new-content options correspond to user selections made by the user via on more options provided in the application UI 106. As an example, an option is provided that allows the user to select or adjust a hyperparameter value of the LLM 108, such as temperature property that is to be included in the query. For instance, the temperature property is used by the LLM 108 to affect randomness of its output. The temperature property may include a parameter that is adjustable between a lower and upper limit, where the lower limit causes the LLM 108 to select a highest probable response and the upper limit causes the LLM 108 to produce more unpredictable, but likely more creative, results.

As another example, an option or constraint may be provided that allows the user to select a desired word and/or slide count. For instance, the word and/or slide count is used to determine a maximum word count property in the query that causes the LLM 108 to generate a response within the maximum word count. In other examples, the content options correspond to one or more formatting properties of the existing content. For instance, rather than receiving a user input of a desired word and/or slide count, the preprocessor 202 automatically determines the maximum word count property for the query based on the word count on existing slides. Other additional or alternative content options are possible and are within the scope of the present disclosure.

Data communication 215 represents a communication between the query interface 204 and the LLM 108, where the query interface 204 transmits the generated text query to the LLM 108. For instance, the LLM 108 analyzes the text query to generate a relevant response. In examples, the LLM 108 uses information included in the context object to understand the context of the query.

Data communication 215 includes the LLM's response to the text query. In some examples, the response includes text output, such as JSON text. In further example, the response includes at least one delimiter used to specify a boundary between different pieces of data in the response. For instance, the delimiter is used to separate paragraphs.

The postprocessor 206 receives the response and parses the text output to generate new content for the slide presentation document 222. In an example implementation, the postprocessor 206 includes the text output in a prospective slide for the slide presentation document 222. In another implementation, the postprocessor 206 separates the text output based on the delimiter(s) into different prospective slides. In some examples, the postprocessor 206 separates the text output into different prospective slides based on a user-selected or automatically determined word and/or slide count. In some examples, the postprocessor 206 applies formatting properties to the text output so that it matches the existing content.

In some examples, the postprocessor 206 uses the text output from the LLM 108 to include in one or more graphical elements (e.g., images, animations, graphs) in one or more prospective slides. For instance, if existing slides in the slide presentation document 222 include certain types of graphical elements, the postprocessor 206 generates and includes like graphical elements in one or more prospective slides to represent the text output. In some implementations, the postprocessor 206 is in communication with one or more other resources 224 to obtain or generate graphical elements for the prospective slides. As an example, the postprocessor 206 is in communication with a search engine to obtain a photograph, clip art, or other type of image relevant to the text output.

As another example, the postprocessor 206 parses at least a portion of the text output into a table, where a graphing tool resource 224 in communication with the postprocessor 206 generates a graph from the data in the table. Other types of resources 224 are possible and are within the scope of the present disclosure.

As another example, the postprocessor 206 is in communication with a resource 224, such as an ML image generation model, where the postprocessor 206 generates a text query and queries the resource 224 based on the text output. For instance, the AI art generation model generates and provides an image relevant to text output of the LLM 108. For example, the ML image generation model may be another language model based on a transformer architecture that is trained to generate images based on textual descriptions, such as the DALL-E model from OpenAI. Alternatively, the LLM 108 may be configured and/or trained to generate images in addition to text. In such examples, the response from the LLM 108 may also include images. In other examples, the generated text query may also be provided to the ML image generation model, rather than (or in addition to) the response generated from the LLM 108. Whether images are generated as a response to the request to generate new slides may also be another content option provided in the UI of the content generator 110.

Data communication 220 represents a communication between the postprocessor 206 and the slide presentation application 212, where the postprocessor 206 transmits prospective slides to the slide presentation application 212. In some examples, the prospective slides are displayed in the application UI 106 for display to the user. In some examples, an option is provided in the application UI 106 that allows the user to select one or more prospective slides to include as new slides in the slide presentation document 222.

Figure 3A:
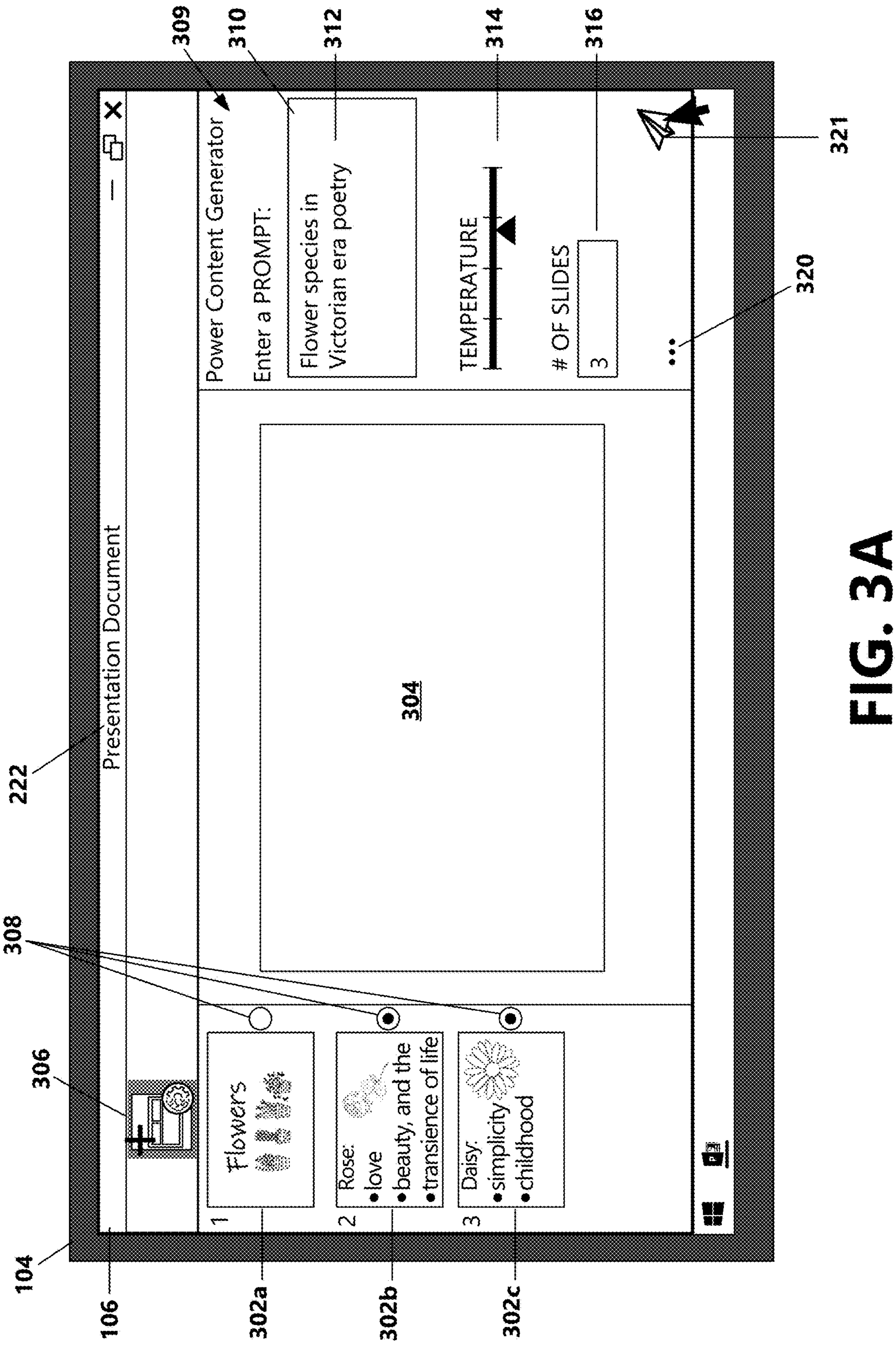
FIGS. 3A-3B are illustrations showing various content generation options provided in an example application UI.
Figure 3B:
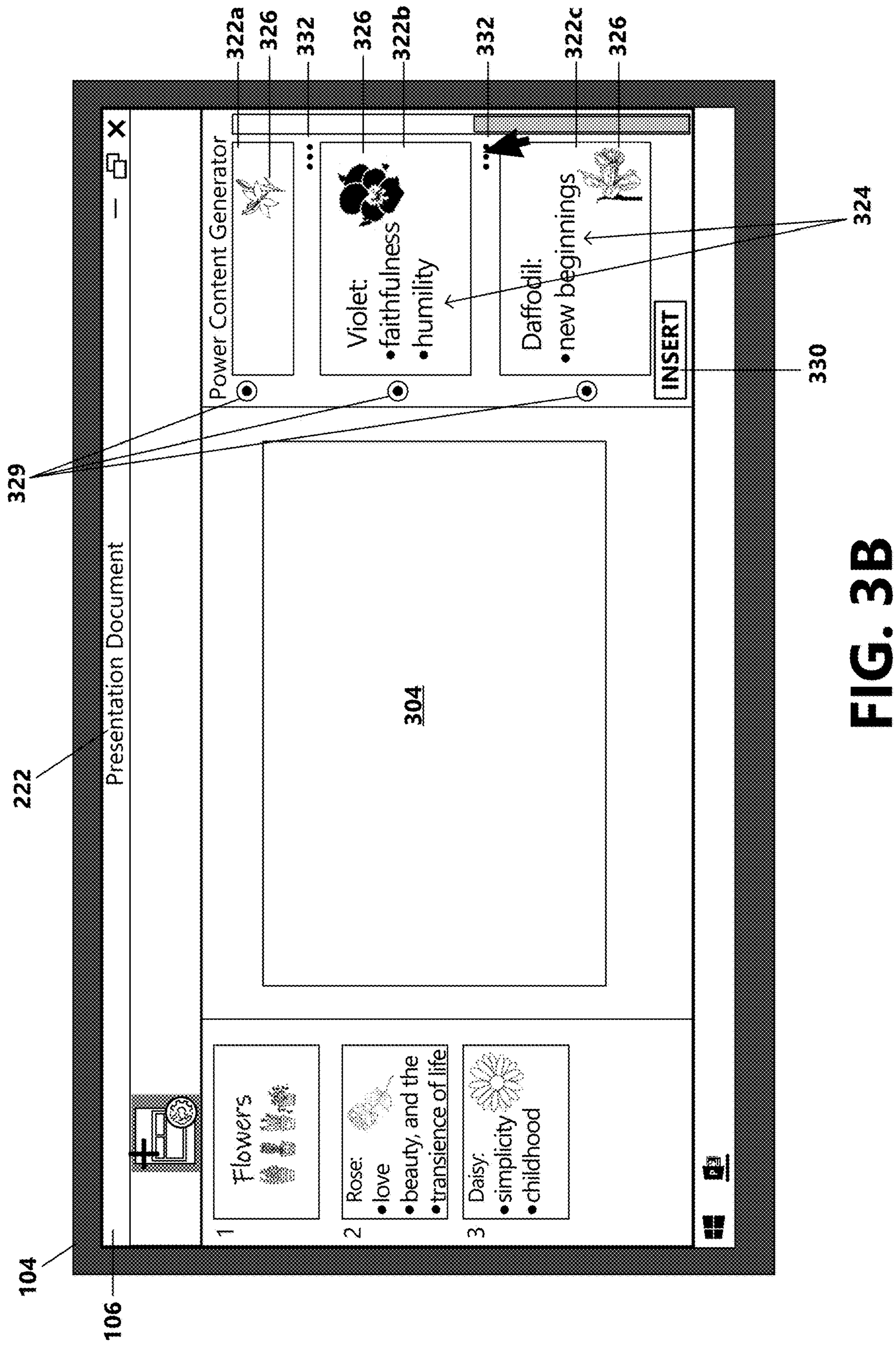

FIGS. 3A-3B are illustrations showing various content generation options provided in an example application UI 106. With reference now to FIG. 3A, the example application UI 106 is depicted as a UI of a slide presentation application 212 presented on a display 104. For instance, a user may use the slide presentation application 212 to compose or edit a slide presentation document 222 that includes slides. As depicted, the slide presentation document 222 includes a plurality of existing slides 302*a*-302*c* (collectively, existing slides 302), and previews of the slides 302*a*-302*c* are displayed in a preview pane of the application UI 106. Additionally, the user may wish to add one or more additional/new slides, such as slide 304, which may be displayed in a primary slide editing portion of the application UI 106.

According to examples, the slide presentation application 212 provides a content generation option 306 in the application UI 106 for automatically generating new slides 304 for the slide presentation document 222. Although depicted in FIG. 3A as a button in a toolbar (e.g., the ribbon), in other examples, the content generation option 306 is presented in other methods or in response to other selections or inputs (e.g., keyboard shortcuts, voice commands, different menu options). When the content generation option 306 is selected or otherwise activated, the application UI 106 is modified to display features relating to the content generation features. For instance, a content generation portion or pane 309 may be displayed within the application UI 106.

In some examples, selection of the content generation option 306 causes a default selection of all existing slides 302 for use in generating context for the text query. In other examples, selection of the content generation option 306 causes a display of selectors 308 corresponding to the existing slides 302. For instance, the selectors 308 can be used by the user to select which of the existing slides 302 to use as a basis for context for new slides 304.

According to examples, in response to a selection of the content generation option 306 and one or more existing slides 302, content included in the selected slides 302 is extracted by the preprocessor 202 for inclusion as context information in a text query to the LLM 108. For instance, the preprocessor 202 gathers string content from the selected slides 302 and generates a context object. In some examples, the preprocessor 202 further prepends the context object with a context statement string, such as "Given the following context:". In some examples, the preprocessor 202 further extracts images and performs image recognition on the extracted images. For instance, the image recognition information is included in the context object. In further examples, the preprocessor 202 gathers formatting properties, such as a word count range, text formatting, paragraph formatting, graph formatting, image formatting, and/or other properties.

The content generation pane 309 includes a variety of UI elements for adjusting the ultimate text query that is generated. For example, a prompt input field 310 is provided in the application UI 106. The prompt input field 310 receives user input (referred to as prompt input 312), such as a typed or uttered phrase or individual key words corresponding to content wanted by the user for inclusion in new slides 304. In the example depicted in FIG. 3A, the prompt input 312 includes the phrase, "Flower species in Victorian era poetry." Alternatively or additionally, the prompt input 312 may include requests or action phrases, such as "provide a description of" or "generate additional details for." The preprocessor 202 receives the prompt input 312 and includes the prompt input 312 in the text query to the LLM 108. In some examples where the prompt input 312 is received, the preprocessor 202 includes the prompt input 312 after the context object prepended by an instruction string that indicates an action to be taken, such as "do the following"+ prompt input 312.

In some examples, additional options are provided in the application UI 106, such as a temperature selector 314, which allows the user to select or adjust the temperature property in the text query. In some examples, a lower parameter corresponds to a more probable and, thus, more factual response, and a higher parameter corresponds to a more unpredictable, and thus, more creative response. Another example option that is depicted in FIG. 3A includes a slide number selector 316, where the user is able to enter to select a number of desired slides. Additional options may be provided for limiting a length of text returned and/or a length of text for each slide returned. For instance, a slide limitation, character limitations, etc., may prevent the LLM 108 from generating too much information that is not needed, which would utilize unnecessary computational resources of the LLM. Thus, resources needed to process the information are conserved.

In further examples, additional input fields, which may be accessed by selected an additional-field UI element 320, for receiving new content parameters are provided. For instance, new content parameters input by the user via the temperature selector 314, slide number selector 316, or other input elements are communicated to the content generator 110 to generate the text query and the prospective slides. As one example, a context selection option may be provided that allows the user to select if the context from the extracted slides should be included or excluded from the text query that is generated.

When a submit UI element 321 is selected, a query object is generated and transmitted to the LLM for processing. The query object is generated from the selections and modifications to the fields and other selectable options presented. For instance, the query object includes the extracted context from the selected slides, the prompt input (either user-inputted or default where no user input is received), the content options and constraints (e.g., temperature, slide number limit, character/text limit). The LLM then provides a response that is used to generate one or more prospective slides.

With reference now to FIG. 3B, graphical representations of example prospective slides 322*a*-322*c* (collectively, prospective slides 322) generated by the content generator 110 are displayed in the example application UI 106. For instance, each prospective slide 322 includes text output 324 generated by the LLM 108. For instance, the text output 324 generated by the LLM 108 is separated into different prospective slides 322 based on a delimiter (e.g., a paragraph separator, tab, special character). In some examples, additional content is included in one or more prospective slides 322. For example, and as depicted, images 326 are obtained or generated, such as based on text output 324 generated by the LLM 108 and included in one or more prospective slides 322.

In some examples, selectors 329 corresponding to the prospective slides 328 are provided in the application UI 106. For instance, the selectors 329 can be used by the user to select which of the prospective slides 328 to insert into the slide presentation document 222. In some examples, an insert option 330 is provided, which when selected, causes the selected prospective slides 328 to be generated and inserted into the slide presentation document 222 as new slides.

In further examples, additional options are provided corresponding to selected prospective slides 328. In an example implementation, a selection of an additional option selector 332, the user is presented with various options. Example options include to split the content (e.g., text output 324 and/or images 326) into multiple slides, to combine slides, to expand the content, perform another query, etc.

For instance, selection to expand the content may cause the content generator 110 to generate a second text query to the LLM 108. According to examples, the context object of the second text query to the LLM 108 includes string content included in the selected prospective slides 328, the first text query, and the text output 324 generated by the LLM 108 in response to the first text query. Additionally, the second text query includes a prompt input associated with expanding the string content included in the selected prospective slides 328. For instance, a prompt input of "expand" or "generate additional information" may be automatically generated in response to the selection of an expand content option.

Figure 4:
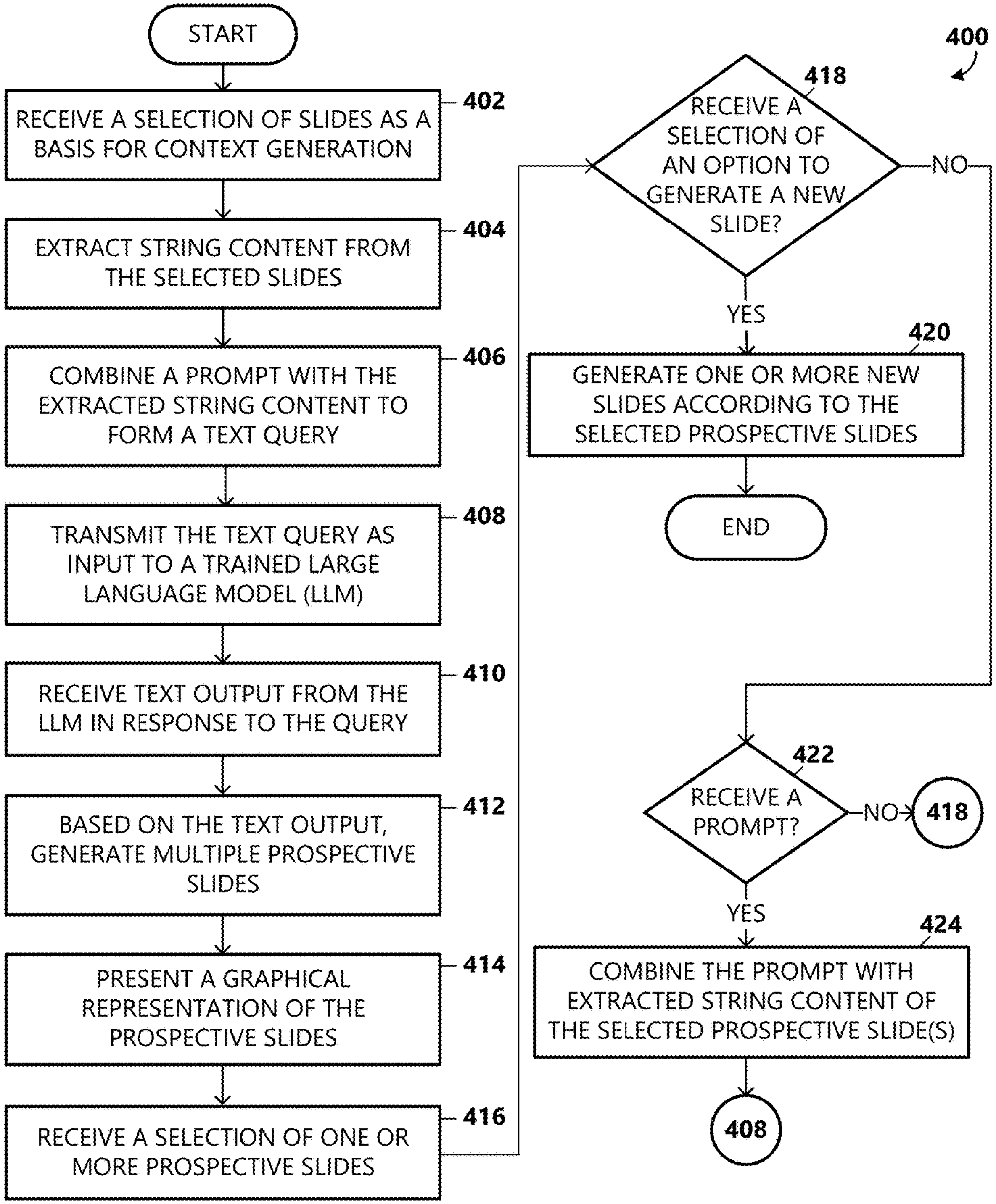
FIG. 4 is a flow diagram depicting an example method of generating new content based on existing productivity application content.

FIG. 4 is a diagram illustrating an example method 400 of generating new content based on existing productivity application content. At operation 402, one or more existing slides 302 of a slide presentation document 222 are selected as a basis for context for new slides 304. In some examples, the selection includes all existing slides in the slide presentation document 222. In other examples, the selection includes user-selected existing slides that are a subset of all slides in the presentation.

At operation 404, string content is extracted from the selected existing slides 302. In some example implementations, additional content is extracted, such as images or textual data extracted from images. For instance, the content generator 110 is in communication with a resource 214 for performing image recognition on the extracted images, where the image recognition information is included with the extracted string content.

At operation 406, prompt input 312 is received and combined with the extracted string content to form a text query. In some examples, the extracted string content is included as a context object with a prepended by a context statement string and the prompt input 312 is prepended by an instruction string. In other examples, the prompt input 312 is not received from the user, and a default prompt is prepended to the extracted string content to form the text query.

In some examples, the generated text query may also include additional values based on the content generation options or constraints. For instance, the text query may include a temperature value or constraints, such as character/text limits or slide limits. As discussed above, the constraints may be generated from input from the user or from the slides that were selected for context. As an example, based on the slides selected for context, an average and/or maximum text count (e.g., word count, character count, sentence count) may be determined. The text-limit constraint may then be automatically generated based on that average and/or maximum text count. By generating the constraint in such a manner, the resources of the LLM 108 are conserved and limited to generating outputs that will actually be useful based on the current slide context. For instance, because length of the output generated from LLM 108 for each slide is more likely to match and/or fit within the slide, additional modifications (and input/output cycles) from the user are avoided or substantially reduced.

As yet another option, the generated query may also be modified to also, or alternatively, request images. The option to request images may be based on a user input selecting a corresponding UI element. In other examples, the option to request images may be based on the context of the slides that are selected. For instance, if the selected slides include images, the option to request images in the text query may be automatically selected or incorporated into the text query. Accordingly, the prospective slides that are ultimately generated may also include text to more closely match the formatting and configuration of the selected slides.

At operation 408, the text query is transmitted to the LLM 108 as input. The LLM 108 generates a response including text output 324, which is received by the content generator 110 at operation 410. In some examples, the content generator 110 may also or alternatively receive images generated by the LLM 108 and/or another resource or ML model, as discussed further above.

At operation 412, the content generator 110 generates a one or more prospective slides 322 based on the text output 324 (and/or images) received in operation 410. In some examples, the text output 324 is parsed and separated into multiple prospective slides 322 based on one or more delimiters in the text output 324. In some implementations, the content generator 110 further includes a plurality of images 326 or other graphical elements in one or more prospective slides 322 where such images are included.

At operation 414, graphical representations of the prospective slides 322 are presented in the application UI 106. For instance, once the prospective slides 322 are generated, the presentation application or the content generator 110 causes the display or presentation of the prospective slides 322 (e.g., by sending the corresponding data for display at a user device). At operation 416, one or more of the prospective slides 322 are selected by the user.

At decision operation 418, a determination is made as to whether a selection of an insert option 330 is received to insert the selected prospective slides 322 into the slide presentation document 222. When the insert option 330 is selected, the selected prospective slides 322 are generated and inserted into the slide presentation document 222 as new slides.

When the insert option 330 is not selected, a determination is made at decision operation 422 as to whether a prompt is received. If no prompt is received, the method 400 may flow back to operation 418 where a selection of generating a new slide is awaited. If a prompt is received, the method 400 flows to operation 424 where a second text query is generated. As an example, selection of the expand option in association with a selected prospective slide 322 provides a prompt input to the content generator 110, such as an expand instruction. When the expand option is selected or another prompt input is received, at operation 424, string content of the selected prospective slide 322 is extracted and included in a context object of a second text query and the prompt input is combined with the context object. The method 400 returns to operation 408, where the second text query is transmitted to the LLM 108, and one or more prospective slides are then generated from the response from the LLM 108. The method 400 may end when one or more prospective slides 322 are generated and inserted into the slide presentation document 222 as new slides.

FIG. 5 is a block diagram illustrating physical components (e.g., hardware) of a computing device 500 with which examples of the present disclosure may be practiced. The computing device components described below may be suitable for one or more of the components of the system 100 described above. In a basic configuration, the computing device 500 includes at least one processing unit 502 and a system memory 504. Depending on the configuration and type of computing device 500, the system memory 504 may comprise volatile storage (e.g., random access memory), non-volatile storage (e.g., read-only memory), flash memory, or any combination of such memories. The system memory 504 may include an operating system 505 and one or more program modules 506 suitable for running software applications 550, the content generator 110, and other applications.

The operating system 505 may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including one or more of the stages of the method 400 illustrated in FIG. 4. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 500 on the single integrated circuit (chip). Examples of the present disclosure may also be practiced using other technologies capable of performing logical operations such as, for example, AND, OR, and NOT, including mechanical, optical, fluidic, and quantum technologies.

The computing device 500 may also have one or more input device(s) 512 such as a keyboard, a mouse, a pen, a sound input device, a touch input device, a camera, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 504, the removable storage device 509, and the non-removable storage device 510 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer readable media may be part of the computing device 500. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, a system is provided for generating slides from a large language model (LLM), including: a processing system; and memory storing instructions that, when executed by the processor, cause the system to: receive a selection of existing slides in a presentation document as a basis for context generation; extract string content from the selected existing slides; combine a prompt input with the extracted string content to form a text query; transmit the text query as input to a trained large language model (LLM); receive, from the LLM in response to the text query, text output having at least one delimiter; based on the text output and the at least one delimiter, generate multiple prospective slides from the text output; cause a presentation of a graphical representation of the prospective slides; receive a selection of one or more of the prospective slides for inclusion in a slide presentation; and generate one or more new slides, for the presentation document, according to the selection of the one or more prospective slides.

In an example, in combining the prompt input with the extracted string content, the instructions cause the system to generate a context object including the extracted string content prepended by a context statement string. In another example, in combining the prompt input with the extracted string content, the instructions cause the system to prepend the prompt input with an instruction string that indicates an action to be taken. In a further example, the instructions further cause the system to receive a new-content option selection corresponding to a hyperparameter value of the LLM, wherein the new-content option selection is included in the text query. In yet another example, the hyperparameter value is for a temperature property. In still another example, the instructions further cause the system to receive a constraint selection corresponding to a slide count constraint, where the slide count is included in the text query. In still yet another example, the instructions further cause the system to: extract image content from the selected existing slides; generate string content representative of the image content; and include the generated string content in the text query. In still yet a further example, the instructions further cause the system to: generate a second text query including at least a portion of the text output; transmit the second text query as input to an image generation machine learning (ML) model; receive an image as output from the image generation ML model in response to the second text query; and insert the image in one or more of the multiple prospective slides. In still yet another further example, the instructions further cause the system to: receive a selection of one or more of the prospective slides for expansion; combine an expansion instruction with string content included in the one or more selected prospective slides to form a second text query; transmit the second text query as input to the LLM; receive, from the LLM in response to the second text query, second text output having at least one delimiter; based on the second text output and the at least one delimiter, generate additional prospective slides from the text output; and present a graphical representation of the prospective slides.

In another aspect, a computer-implemented method is provided for generating slides from a large language model (LLM), including: receiving, from within a user interface from a presentation application, a selection of existing slides as a basis for context generation; extracting string content from the selected existing slides; receiving a prompt input via a user interface element of the presentation application; combining the prompt input with the extracted string content to form a text query; transmitting the text query as input to a trained large language model (LLM); receiving, from the LLM in response to the text query, text output; multiple prospective slides from the text output; causing a display, within the user interface of the presentation application, of a graphical representation of the prospective slides; receiving a selection of one or more of the prospective slides for inclusion in a slide presentation; and generating one or more new slides according to the selection of the one or more prospective slides.

In an example, the method further includes receiving a new-content option selection corresponding to a temperature property of the LLM; and including the new-content option selection in the text query. In a further example, the method further includes receiving a slide count selection; and including the slide count selection in the text query to limit output from the LLM. In yet another example, the method further includes extracting image content from the selected existing slides; transmitting the image content to an image recognition resource; receiving, from the image recognition resource, string content representative of the image content; and including the string content in the text query. In still another example, the method further includes receiving a selection of one or more of the prospective slides for expansion; combining an expansion instruction with string content included in the one or more selected prospective slides to form a second text query; transmitting the second text query as input to the LLM; receiving, from the LLM in response to the second text query, second text output; based on the second text output, generating additional prospective slides from the text output; and causing a presentation of a graphical representation of the prospective slides. In still yet another example, the method further includes including the text output in a second text query; transmitting the second text query as input to an image generation model; receiving an image from the image generation model in response to the second text query; and including the image in one or more of the multiple prospective slides.

In another aspect, a computer-implemented method is provided for generating slides from a large language model (LLM), including: receiving a selection of content generation option from within a graphical user interface (GUI) of a presentation application; based on receiving the selection of the content generation option, displaying, by the presentation application, a content generation pane including a plurality of user interface elements for modifying a text query for a large language model (LLM); receiving, from within the GUI, a selection of existing slides to be used as context for the text query; extracting string content from the selected existing slides; based on the selected slides, generating a constraint including at least one of a text-length constraint or a slide-number constraint; generating the text query based on the constraint, a prompt, and the extracted string content; transmitting the text query as input to a trained large language model (LLM); receiving an output from the LLM in response to the text query; generating multiple prospective slides from the output; causing a display, within the content generation pane, of a graphical representation of the prospective slides; receiving a selection of one or more of the prospective slides for inclusion in a slide presentation; and generating one or more new slides according to the selection of the one or more prospective slides, wherein formatting of the generated one or more new slides matches formatting of the selected existing slides.

In an example, the text-limit constraint is automatically generated based on text lengths in the selected existing slides. In another example, the slide-number constraint is generated based on user input received in one of the user interface elements of the content generation pane. In a further example, the output from the LLM includes both text output and an image. In yet another example, the method further includes receiving a selection to split one of the prospective slides; and splitting the selected prospective slide into two prospective slides.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for generating slides from a large language model (LLM), comprising:

a processing system; and memory storing instructions that, when executed by the processing system, cause the system to:

generate a user interface for a presentation application, wherein the user interface includes a concurrent display of a primary slide editing portion for editing slides of a presentation document, previews of existing slides, and a content-generation pane;

receive a selection of the existing slides, from the previews of the existing slides, as a basis for context generation;

extract string content from the selected existing slides;

combine a prompt input, received as a textual user input into the content-generation pane, with the extracted string content to form a text query;

transmit the text query as input to a trained large language model (LLM);

receive, from the LLM in response to the text query, text output having at least one delimiter;

based on the text output and the at least one delimiter, generate multiple prospective slides from the text output;

cause a presentation of a graphical representation of a preview of the prospective slides;

receive a selection of one or more of the prospective slides for inclusion in a slide presentation; and generate one or more new slides, for the presentation document, according to the selection of the one or more prospective slides.

2. The system of claim 1, wherein in combining the prompt input with the extracted string content, the instructions cause the system to generate a context object including the extracted string content prepended by a context statement string.

3. The system of claim 1, wherein in combining the prompt input with the extracted string content, the instructions cause the system to prepend the prompt input with an instruction string that indicates an action to be taken.

4. The system of claim 1, wherein the content-generation pane includes a hyperparameter selection option corresponding to a hyperparameter value of the LLM, and wherein the instructions further cause the system to receive a selection of the hyperparameter value from the hyperparameter selection option.

5. The system of claim 4, wherein the hyperparameter value is for a temperature property.

6. The system of claim 1, wherein the instructions further cause the system to receive a constraint selection corresponding to a slide count constraint, where the slide count is included in the text query.

7. The system of claim 1, wherein the instructions further cause the system to:

extract image content from the selected existing slides;

generate string content representative of the image content; and include the generated string content in the text query.

8. The system of claim 1, wherein the instructions further cause the system to:

generate a second text query including at least a portion of the text output;

transmit the second text query as input to an image generation machine learning (ML) model;

receive an image as output from the image generation ML model in response to the second text query; and insert the image in one or more of the multiple prospective slides.

9. The system of claim 1, wherein the instructions further cause the system to:

receive a selection of one or more of the prospective slides for expansion;

combine an expansion instruction with string content included in the one or more selected prospective slides to form a second text query;

transmit the second text query as input to the LLM;

receive, from the LLM in response to the second text query, second text output having at least one delimiter;

based on the second text output and the at least one delimiter, generate additional prospective slides from the text output; and present a graphical representation of the prospective slides.

10. A computer-implemented method for generating slides from a large language model (LLM), comprising:

generating a user interface for a presentation application, wherein the user interface includes a concurrent display of a primary slide editing portion for editing slides of a presentation document, previews of existing slides, and a content-generation pane;

receiving, from within the user interface from a presentation application, a selection of the existing slides, from the previews of the existing slides, as a basis for context generation;

extracting string content from the selected existing slides;

receiving a prompt input, via the content-generation pane, of the presentation application;

combining the prompt input with the extracted string content to form a text query;

transmitting the text query as input to a trained large language model (LLM);

receiving, from the LLM in response to the text query, text output;

generating multiple prospective slides from the text output;

causing a display, within the user interface of the presentation application, of a graphical representation of a preview of the the prospective slides;

receiving a selection of one or more of the prospective slides for inclusion in a slide presentation; and generating one or more new slides according to the selection of the one or more prospective slides.

11. The method of claim 10, further comprising:

receiving a new-content option selection corresponding to a temperature property of the LLM; and including the new-content option selection in the text query.

12. The method of claim 10, further comprising:

receiving a slide count selection; and including the slide count selection in the text query to limit output from the LLM.

13. The method of claim 10, further comprising:

extracting image content from the selected existing slides;

transmitting the image content to an image recognition resource;

receiving, from the image recognition resource, string content representative of the image content; and including the string content in the text query.

14. The method of claim 10, further comprising:

receiving a selection of one or more of the prospective slides for expansion;

combining an expansion instruction with string content included in the one or more selected prospective slides to form a second text query;

transmitting the second text query as input to the LLM;

receiving, from the LLM in response to the second text query, second text output;

based on the second text output, generating additional prospective slides from the text output; and causing a presentation of a graphical representation of the prospective slides.

15. The method of claim 10, further comprising:

including the text output in a second text query;

transmitting the second text query as input to an image generation model;

receiving an image from the image generation model in response to the second text query; and including the image in one or more of the multiple prospective slides.

16. A computer-implemented method for generating slides from a large language model (LLM), comprising:

generating a graphical user interface (GUI) for a presentation application, wherein the user interface includes a concurrent display of a primary slide editing portion for editing slides of a presentation document, previews of existing slides, and a content-generation pane;

receiving a selection of content generation option from within the graphical user interface (GUI) of a presentation application;

based on receiving the selection of the content generation option, displaying, by the presentation application, the content-generation pane including at least one user interface element for modifying a text query for a large language model (LLM);

receiving, from within the GUI, a selection of existing slides, from the previews of the existing slides, to be used as context for the text query;

extracting string content from the selected existing slides;

based on the selected slides, generating a constraint including at least one of a text-length constraint or a slide-number constraint;

generating the text query based on the constraint, a prompt, and the extracted string content;

transmitting the text query as input to a trained large language model (LLM);

receiving an output from the LLM in response to the text query;

generating multiple prospective slides from the output;

causing a display, within the content generation pane, of a graphical representation of the prospective slides;

receiving a selection of one or more of the prospective slides for inclusion in a slide presentation; and generating one or more new slides according to the selection of the one or more prospective slides, wherein formatting of the generated one or more new slides matches formatting of the selected existing slides.

17. The method of claim 16, wherein the text-length constraint is automatically generated based on text lengths in the selected existing slides.

18. The method of claim 16, wherein the slide-number constraint is generated based on user input received in one of the user interface elements of the content generation pane.

19. The method of claim 16, wherein the output from the LLM includes both text output and an image.

20. The method of claim 16, further comprising:

receiving a selection to split one of the prospective slides; and splitting the selected prospective slide into two prospective slides.

* * * * *